US009354448B2

(12) United States Patent
Hikmet et al.

(10) Patent No.: US 9,354,448 B2
(45) Date of Patent: May 31, 2016

(54) LIGHTING APPARATUS

(75) Inventors: Rifat Ataa Mustafa Hikmet, Eindhoven (NL); Ties Van Bommel, Horst (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1517 days.

(21) Appl. No.: 12/993,875

(22) PCT Filed: May 27, 2009

(86) PCT No.: PCT/IB2009/052226
§ 371 (c)(1),
(2), (4) Date: Nov. 22, 2010

(87) PCT Pub. No.: WO2009/147582
PCT Pub. Date: Dec. 10, 2009

(65) Prior Publication Data
US 2011/0122627 A1    May 26, 2011

(30) Foreign Application Priority Data

Jun. 4, 2008   (EP) ..................................... 08104256

(51) Int. Cl.
*F21V 7/06* (2006.01)
*G02B 27/14* (2006.01)
(Continued)

(52) U.S. Cl.
CPC ................. *G02B 27/145* (2013.01); *F21S 8/00* (2013.01); *F21S 10/00* (2013.01); *F21S 48/1731* (2013.01); *F21V 9/00* (2013.01); *F21V 9/16* (2013.01); *F21V 14/00* (2013.01); *G02B 27/0905* (2013.01); *G02B 27/095* (2013.01); *G02B27/0938* (2013.01); *G02B 27/0977* (2013.01); *G02B 27/1006* (2013.01); *G02B 27/144* (2013.01); *F21V 7/06* (2013.01); *F21V 23/0471* (2013.01); *F21Y 2101/025* (2013.01)

(58) Field of Classification Search
CPC ............ B60Q 1/44; B60Q 1/46; B60Q 1/302; B60Q 1/52; B60Q 2400/20; G02B 27/145; G02B 27/144; G02B 27/1006; G02B 27/0905; G02B 27/0938; G02B 27/0977; G02B 27/095; F21S 48/1731; F21S 8/00; F21S 10/00; F21V 14/00; F21V 9/16; F21V 9/00; F21V 23/0471
USPC .................. 362/555, 84; 296/187.03, 187.11, 296/203.04
See application file for complete search history.

(56) References Cited

U.S. PATENT DOCUMENTS 4,491,383 A     1/1985  Pera et al.
4,895,419 A *   1/1990  Doyle et al. .................... 359/12
(Continued)

FOREIGN PATENT DOCUMENTS

DE        8708467 U1    3/1988
DE       29712018 U1    9/1997
(Continued)

*Primary Examiner* — Stephen F Husar
*Assistant Examiner* — Danielle Allen

(57) ABSTRACT

The invention relates to a lighting apparatus comprising a laser source (2) for emitting laser light (3). The lighting apparatus further comprises a first laser light modification unit (7) for modifying an optical characteristic of the laser light, which first laser light modification unit (7) is situated at a first location, and a second laser light modification unit (8) for modifying an optical characteristic of the laser light, which second laser light modification unit (8) is situated at a second location. The lighting apparatus further comprises a laser light distribution modification unit (4) for modifying a laser light distribution (5, 6) directed onto at least one of the first and second laser light modification units (7, 8) from a first to a second laser light distribution which is different from the first laser light distribution.

17 Claims, 6 Drawing Sheets

(51) Int. Cl.
*F21S 10/00* (2006.01)
*F21V 9/00* (2015.01)
*G02B 27/09* (2006.01)
*G02B 27/10* (2006.01)
*F21V 9/16* (2006.01)
*F21S 8/00* (2006.01)
*F21V 14/00* (2006.01)
*F21S 8/10* (2006.01)
*F21V 23/04* (2006.01)
*F21Y 101/02* (2006.01)

(56) References Cited

U.S. PATENT DOCUMENTS

| | | | |
|---|---|---|---|
| 5,506,684 A * | 4/1996 | Ota et al. | 356/401 |
| 6,350,041 B1 | 2/2002 | Tarsa et al. | |
| 6,594,090 B2 | 7/2003 | Kruschwitz et al. | |
| 6,874,926 B2 | 4/2005 | Nousiainen | |
| 7,005,679 B2 | 2/2006 | Tarsa et al. | |
| 7,234,820 B2 | 6/2007 | Harbers et al. | |
| 2002/0084749 A1 | 7/2002 | Ayala et al. | |
| 2004/0076395 A1 | 4/2004 | Poisel et al. | |
| 2006/0198418 A1 * | 9/2006 | Hama et al. | 372/108 |
| 2009/0122571 A1 * | 5/2009 | Simmons et al. | 362/546 |

FOREIGN PATENT DOCUMENTS

| | | |
|---|---|---|
| EP | 0202632 A2 | 11/1986 |
| EP | 1605199 A2 | 12/2005 |
| WO | 2005006036 A1 | 1/2005 |
| WO | 2006007301 A1 | 1/2006 |

* cited by examiner

LIGHTING APPARATUS

FIELD OF THE INVENTION

The invention relates to a lighting apparatus, a lighting method and a computer program for controlling the lighting apparatus.

BACKGROUND OF THE INVENTION

WO 2006/007301 A1 discloses a lighting apparatus including a light source, a light guide comprising an output surface, emissive material positioned between the light source and the output surface of the light guide, and an interference reflector positioned between the emissive material and the output of the light guide. The light source emits light having a first optical characteristic. The emissive material emits light having a second optical characteristic when illuminated with light having the first optical characteristic. The interference reflector substantially transmits light having the second optical characteristic and substantially reflects light having the first optical characteristic. This lighting apparatus has the drawback that the illumination configuration is fixed and cannot be modified easily.

OBJECT AND SUMMARY OF THE INVENTION

It is an object of the present invention to provide a lighting apparatus, a lighting method and a computer program for controlling the lighting apparatus, wherein the illumination configuration can be modified more easily.

In a first aspect of the present invention, a lighting apparatus is provided, comprising:
 a laser source for emitting laser light,
 a first laser light modification unit for modifying an optical characteristic of the laser light, the first laser light modification unit being situated at a first location,
 a second laser light modification unit for modifying an optical characteristic of the laser light, the second laser light modification unit being situated at a second location,
 a laser light distribution modification unit for modifying a laser light distribution directed onto at least one of the first and second laser light modification units from a first laser light distribution to a second laser light distribution which is different from the first laser light distribution.

The invention is based on the recognition that the illumination configuration can be modified easily if laser light of a laser source is directed onto at least one of a first and a second laser light modification unit which are situated at a first and a second location, respectively, and if a laser light distribution modification unit modifies the laser light distribution directed onto at least one of the first and second laser light modification units from a first to a second laser light distribution which is different from the first laser light distribution. For example, the first laser light distribution may correspond to laser light directed onto the first laser light modification unit only, and the second laser light distribution may correspond to laser light directed onto the second laser light modification unit only. Since the first and the second laser light modification unit are situated at a first and a second location, respectively, the illumination configuration is modified by modifying the laser light distribution from the first to the second laser light distribution. Furthermore, since a laser source provides laser light with a laser beam having a high energy density nature, the light energy can be transported to at least one of the first and second laser light modification units over relatively large distances, while the light energy is confined to a very small beam diameter. A small shift in the position of the laser beam, for example, a small shift of a fraction of a millimeter, can be sufficient to modify the laser light distribution directed onto at least one of the first and second laser light modification units. The combination of a laser source, a first laser light modification unit situated at a first location, a second laser light modification unit situated at a second location and a laser light distribution modification unit for modifying the laser light distribution directed onto at least one of the first and second laser light modification units from a first to a second laser light distribution thus allows easy modification of the illumination configuration.

The first and the second location are preferably different. Furthermore, the lighting apparatus may comprise several first and/or several second laser light modification units, and the laser light distribution can be modified to several first and/or several second laser light distributions, i.e. the invention is not limited to only two laser light modification units or to only two laser light distributions.

The first and second laser light modification units are adapted to modify an optical characteristic of the laser light which is directed onto these units. The optical characteristic, which can be modified by the first and/or second laser light modification units is, for example, the spectral distribution of the light, its collimation, direction, intensity and/or beam pattern. The spectral distribution and other properties of the light directed onto at least one of the first and second laser light modification units can be modified, for example, by luminescent material which emits luminescent light if the laser light is directed onto this luminescent material. The spectral and also other characteristics of the laser light can thus be modified by total or partial conversion using luminescent materials such as organic or inorganic phosphors. In one embodiment, a beam pattern, which can be generated by at least one of the first and second laser light modification units is, for example, a picture or a word.

The laser light distribution unit preferably comprises optical elements which allow modification of a laser light distribution directed onto at least one of the first and second laser light modification units from a first to a second light distribution which is different from the first laser light distribution. These optical elements are, for example, beam splitters, mirrors, polarization rotators, etc.

The first and second laser light modification units can be arranged adjacent to each other, such that for a person seeing the light emanating from the first and second laser light modification units, the light seems to be emitted from the same location. In another embodiment, one of the first and second laser light modification units or several first and second light modification units forming a first group can be situated at a first location, and the other of the first and second laser light modification units or another group of first and second laser light modification units can be situated at a second location, wherein the first and the second location are not adjacent to each other so that a person can distinguish between light coming from the first location and light coming from the second location. For example, in one embodiment, the first location is situated in the ceiling of a room above a table for illuminating substantially only this table, and the second location is situated in the ceiling in the middle of the room for illuminating a larger part of this room. The distance between the first and the second location is preferably larger than one centimeter, more preferably larger than ten centimeters and even more preferably larger than one meter. The distance between adjacent laser light modification units is preferably smaller than 1 centimeter, preferably smaller than 0.5 centimeter and preferably smaller than 1 millimeter.

If, in one embodiment, the lighting apparatus is located in a ceiling of a room, the room preferably comprises an intermediate ceiling forming a space between this intermediate ceiling and a further ceiling located above the intermediate ceiling. The intermediate ceiling preferably comprises tiles which can be opened, and the further ceiling is preferably a concrete ceiling. The lighting apparatus is preferably arranged within the space defined by the intermediate ceiling and the further ceiling so that persons who might be in the room cannot come into contact with the laser light. In particular, the lighting apparatus may comprise a security mechanism which is adapted in such a way that the laser source is switched off if a tile of the intermediate ceiling is opened.

The laser light distribution directed onto at least one of the first and second laser light modification units preferably defines how each of these units is illuminated by the laser light, for example, the laser light can be directed onto a first laser light modification unit only, onto a second laser light modification unit only, or onto a first and a second laser light modification unit.

The first and the second laser light distribution are preferably static laser light distributions, i. e. the laser light distribution is not continuously non-stop modified, for example, a light beam does not continuously scan several pixels as in a display, but the laser light distribution remains in the first or in the second laser light distribution for a predefined time, which is preferably longer than 0.5 seconds, preferably longer than 1 second, preferably longer than 30 seconds and preferably longer than 1 minute.

It is preferred that the first and second laser light modification units are adapted to modify the optical characteristic of the laser light differently. This allows modification of the optical characteristic of the light from at least one of the first and second laser light modification units by modifying the laser light distribution from a first to a second laser light distribution. Further modifications of the illumination configuration can thus be easily achieved.

It is further preferred that at least one of the first and second laser light modification units comprises a luminescent material for emitting luminescent light if the laser light is directed onto the luminescent material. The luminescent light has one or several wavelengths which are different from one or several wavelengths of the laser light. The spectral distribution of the laser light and the luminescent light may correspond to a single wavelength or to several wavelengths.

It is preferred that the first laser light modification unit comprises a first luminescent material for emitting first luminescent light if the laser light is directed onto the first luminescent material, while the second laser light modification unit comprises a second luminescent material for emitting second luminescent light if the laser light is directed onto the second luminescent material, and the spectral distributions of the first and the second luminescent light are different. In particular, the first and the second luminescent light have different colors or different color temperatures. In a preferred embodiment, the lighting apparatus may comprise at least one color unit for generating light having a modifiable color, wherein the color unit comprises at least two luminescent materials of the first and the second luminescent material, and the laser light distribution modification unit is adapted to adjust the ratio of the intensity of the laser light directed onto one of the at least two luminescent materials to the intensity of the laser light directed onto the other of the at least two luminescent materials, while different ratios of intensity of the laser light correspond to different first and second laser light distributions, and the spectral distribution of the luminescent light emitted by one of the at least two luminescent materials is different from that of the luminescent light emitted by the other of the at least two luminescent materials. This allows modification of the color of the light emitted by the color unit by modifying the laser light distribution from a first to a second laser light distribution, particularly by modifying the ratio between the intensity of the laser light directed onto at least one of the first and second luminescent materials and the intensity of the laser light directed onto the other of the first and second luminescent materials. In one embodiment, the ratio between the intensity of the laser light directed onto at least one of the first and second luminescent materials and the intensity of the laser light directed onto the other of the first and second luminescent materials is determined by moving a laser spot formed by the laser light from one to the other luminescent material. During this process, the spot can be located on one of these luminescent materials only or on both. By moving the laser spot, the areas illuminated by the laser light on the first and on the second luminescent material can be modified in order to control the color and/or the color temperature of the light emitted by the color unit.

The laser light distribution modification unit preferably does not comprise absorbing elements. The overall intensity of the laser light generated by the laser source is preferably modified by modifying the power of the laser source only.

It is further preferred that the first laser light distribution comprises an intensity distribution of the laser light directed onto at least one of the first and second laser light modification units, which is different from the intensity distribution of the laser light directed onto at least one of the first and second laser light modification units of the second laser light distribution. Since the intensity distribution can be modified easily, for example, by using polarization direction rotators, half-wave plates in combination with polarizing beam splitters, rotatable reflectors and dielectrics, switchable reflectors with controllable transmission and reflection beam manipulators based on the electro-wetting principle and electrophoretic cells, the laser light distribution can easily be modified from a first to a second laser light distribution by modifying the intensity distribution of the laser light. In a preferred embodiment, the laser light distribution modification unit is adapted to modify only the intensity distribution of the laser light directed onto at least one of the first and second laser light modification units. In another embodiment, the laser light distribution is modified by moving a laser spot directed onto at least two laser light modification units from one to the other laser light modification unit so that the laser spot is located on one of these laser light modification units only or on both, as described above with reference to the color unit.

It is further preferred that the laser light distribution modification unit comprises at least one beam-splitting unit for splitting the laser light into a first beam directed onto the first laser light modification unit and a second beam directed onto the second laser light modification unit, wherein the at least one beam-splitting unit is adapted in such a way that an intensity of at least one of the first and second beams is modifiable. The first and/or the second beam can be directly directed onto the first and/or the second laser light modification unit, respectively, or via at least one optical element such as a redirection element or redirection unit, for example, a mirror. For modifying the intensity of at least one of the first and second beams, the beam-splitting unit preferably comprises an intensity modification element, which is, for example, a polarization converter or polarization rotator. For example, a half-wave plate can be rotated with respect to the direction of polarization of a beam of polarized laser light changing the state of polarization of the laser light and eventually changing the direction of polarization. In this way, laser light incident on a polarizing beam splitter can be sent totally in one or in another of the beam-splitting directions. In an intermediate state, in which light is, for example, elliptically polarized, the ratio between the intensities of the laser light in one of the beam-splitting directions and the laser light in another of the beam-splitting directions can be adjusted. Instead of a half-wave plate, also other elements for modifying the polarization of the laser light can be used, for example, a liquid-crystal cell in an electrical birefringence mode for adjusting the direction and the state of polarization of the laser light. Also a liquid-crystal cell in the twisted-nematic configuration can be used for modifying the polarization. If an intensity-modifying element is used, this element is preferably located in the first and/or in the second beam. By using this beam-splitting unit, the laser light distribution can be easily modified from a first to a second laser light distribution, and the illumination configuration can thus be easily modified.

It is further preferred that the laser light distribution modification unit comprises several beam-splitting units for splitting the laser light into a first and a second beam, wherein at least one of the first and second laser light modification units is assigned to at least one of the beam-splitting units, the beam-splitting units being adapted to direct the first beam of at least one of the beam-splitting units to the at least one of the first and second laser light modification units assigned to the at least one beam-splitting unit and to direct the second beam of the at least one beam-splitting unit to another beam-splitting unit, the at least one beam-splitting unit being adapted in such a way that an intensity of at least one of the first and the second beam is modifiable. This allows several of the beam-splitting units to be arranged along a line, wherein the laser light is directed from a first to a second beam-splitting unit, and so forth. Since the intensity of at least one of the first and second beams of at least one beam-splitting unit is modifiable, the laser light distribution directed onto the laser light modification units assigned to the beam-splitting units can be easily modified, thereby modifying the illumination configuration. Each beam-splitting unit is preferably adapted to modify the intensity of at least one of the first and second beams, which allows modification of the laser light distribution between many different first and second laser light distributions. Particularly if the intensity can be modified continuously, the laser light distribution can be modified between a continuum of different laser light distributions which can be regarded as first and second laser light distributions, which are preferably static, i.e. if a desired laser light distribution, i.e. a desired first or second laser light distribution has been reached, the laser light distribution remains unchanged during the above-mentioned predefined time.

It is further preferred that at least one of the first and second laser light modification units comprises a beam-shaping unit for beam-shaping light directed onto the beam-shaping unit. This allows modification of the beam shape by modifying the laser light distribution directed onto at least one of the first and second laser light modification units. Consequently, the beam shape and thus the illumination configuration can be easily modified by modifying the laser light distribution directed onto at least one of the first and second laser light modification units.

It is further preferred that the first laser light modification unit comprises a first beam-shaping unit for beam-shaping light directed onto the first beam-shaping unit, and the second laser light modification unit comprises a second beam-shaping unit for beam-shaping light directed onto the second beam-shaping unit, the first and the second beam-shaping unit being adapted to beam-shape light differently. This allows modification of the shape of the light beam from the first and/or the second laser light modification unit and hence the illumination configuration by modifying the laser light distribution directed onto at least one of the first and second laser light modification units.

It is further preferred that at least one of the first and second laser light modification units comprises a redirection unit for redirecting light directed onto the at least one of the first and second laser light modification units. This allows easy modification of the direction of the light from at least one of the laser light modification units and hence the illumination configuration by modifying the laser light distribution directed onto at least one of the first and second laser light modification units.

In a preferred embodiment, the first laser light modification unit comprises a first redirection unit for redirecting light directed onto the first laser light modification unit, and the second laser light modification unit comprises a second redirection unit for redirecting light directed onto the second laser light modification unit, the first and the second redirection unit being adapted to redirect light in different directions. This allows modification of the direction of the light beam from at least one of the first and second laser light modification units and hence modification of the illumination configuration by modifying the laser light distribution directed onto at least one of the first and second laser light modification units.

The laser light distribution modification unit is preferably adapted in such a way that it can adjust the ratio between the intensity of laser light directed onto the first laser light modification unit and the intensity of laser light directed onto the second laser light modification unit in such a way that a first laser light modification unit is illuminated in a first laser light distribution only, a second laser light modification unit is illuminated in a second laser light distribution only, and that two or more first and second laser light modification units are illuminated simultaneously in a further laser light distribution, wherein the ratio between the intensity of the laser light directed onto a first laser light modification unit and the intensity of the laser light directed onto a second laser light modification unit can be modified. Different ratios preferably correspond to different laser light intensity distributions.

It is further preferred that the lighting apparatus comprises a laser light modification unit sensor for determining the position of at least one of the first and second laser light modification units, and a control unit for controlling the laser light distribution modification unit in such a way that laser light of the first and second laser light distributions meets at least one of the first and second laser light modification units, using the determined position. This allows, for example, manual modification of the position of at least one of the laser light modification units, in which position the lighting apparatus is still operable.

In a preferred embodiment, the lighting apparatus further comprises a person presence sensor for determining whether a person is present in the vicinity of the lighting apparatus, and a control unit for controlling the lighting apparatus in dependence on the determination whether a person is present in the vicinity of the lighting apparatus. It is further preferred that the person presence sensor is adapted to determine whether or not a person is moving in the vicinity of the lighting apparatus, in which case the control unit is adapted to control the lighting apparatus in dependence on the determination whether a person is moving in the vicinity of the lighting apparatus. The lighting apparatus is located in, for example, a room in which the vicinity of the lighting apparatus is, for example, an area within the room close to this lighting apparatus, or the whole room is regarded as being the vicinity of the lighting apparatus. This allows adaptation of the illumination configuration to the movement or presence of a person in the vicinity of the lighting apparatus, particularly in a room in which the lighting apparatus is located.

In a further aspect of the present invention, a lighting method is provided, comprising the steps of:

emitting laser light from a laser source, directing the laser light onto at least one of a first and a second laser light modification unit, the first laser light modification unit being situated at a first location and adapted to modify an optical characteristic of the laser light, the second laser light modification unit being situated at a second location and adapted to modify an optical characteristic of the laser light, modifying, by means of a laser light distribution modification unit, a laser light distribution directed onto at least one of the first and second laser light modification units from a first to a second laser light distribution which is different from the first laser light distribution.

In a further aspect of the present invention, a computer lighting program is provided, comprising program code means for causing a lighting apparatus as defined in claim 1 to carry out the steps of the lighting method as defined in claim 14, when the computer program is run on a computer controlling the lighting apparatus.

It is to be noted that the lighting apparatus of claim 1, the lighting method of claim 14 and the lighting computer program of claim 15 have similar and/or identical preferred embodiments as defined in the dependent claims.

It is also to be noted that a preferred embodiment of the invention may be alternatively any combination of the dependent claims with the respective independent claim.

BRIEF DESCRIPTION OF THE DRAWINGS

These and other aspects of the invention are apparent from and will be elucidated with reference to the embodiments described hereinafter. In the drawings.

DESCRIPTION OF EMBODIMENTS

Figure 1:
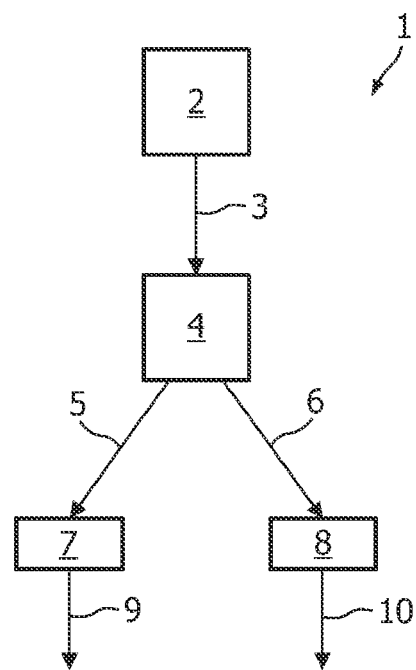
FIG. 1 shows schematically, by way of example, an embodiment of a lighting apparatus.

FIG. 1 shows schematically, by way of example, an embodiment of a lighting apparatus 1 comprising a laser source 2 for emitting laser light 3. The lighting apparatus 1 further comprises a first laser light modification unit 7 situated at a first location and adapted to modify an optical characteristic of the laser light in such a way that modified light is generated. For example, if the first laser light modification unit 7 comprises a first luminescent material, first luminescent light 9 is emitted if the laser light 3, 5 is directed onto the first luminescent material, wherein the spectral distribution of the first luminescent light 9 is different from the spectral distribution of the laser light 3, 5.

The lighting apparatus 1 further comprises a second laser light modification unit 8 situated at a second location and adapted to modify an optical characteristic of the laser light in such a way that modified light 10 is generated. For example, if the second laser light modification unit 8 comprises a second luminescent material, second luminescent light 10 is emitted if the laser light 3, 6 is directed onto the second luminescent material 8, wherein the spectral distribution of the second luminescent light 10 is different from the spectral distribution of the laser light 3, 6.

The lighting apparatus 1 further comprises a laser light distribution modification unit 4 for modifying the laser light distribution, which is indicated in FIG. 1 by two arrows 5, 6, directed onto at least one of the first and second laser light modification units 7, 8 from a first to a second laser light distribution which is different from the first laser light distribution. In this embodiment, the first and second laser light distributions are static laser light distributions.

The spectral distributions of the first modified light 9 and the second modified light 10 are preferably different. This allows modification of the color of the light 9, 10 transformed by the first and second laser light modification units 7, 8, and, in particular, emitted by the first and second luminescent materials, by modifying the ratio of the intensity of the laser light 5, 6 directed onto the first and second laser light modification units 7, 8. The combination of the laser light distribution modification unit 4 and the first and second laser light modification units 7, 8 comprising, in particular, the first and second luminescent materials can thus be regarded as a color unit for generating light having a modifiable color.

Figure 2:
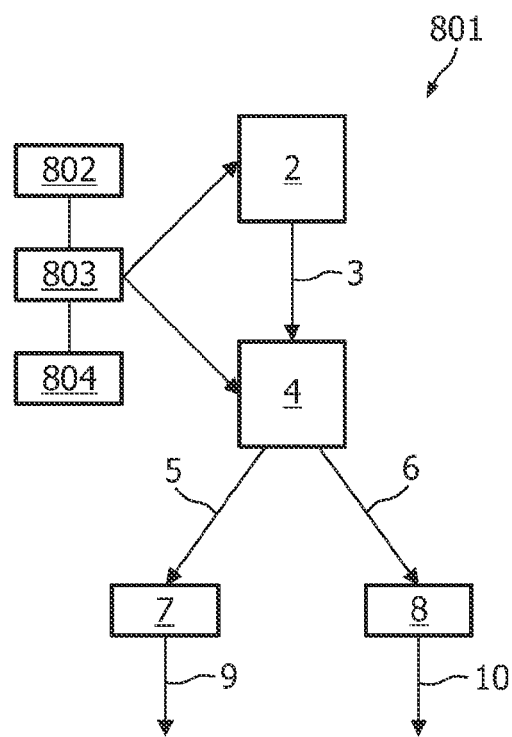
FIG. 2 shows schematically, by way of example, another embodiment of a lighting apparatus.

FIG. 2 shows schematically, by way of example, another embodiment of a lighting apparatus 801 according to the invention.

In addition to the laser source 2, the laser light distribution modification unit 4 and the first and second laser light modification units 7, 8, the lighting apparatus 801 comprises a laser light modification unit sensor 802 for determining the position of at least one of the first and second laser light modification units 7, 8, a control unit 803 for controlling the laser light distribution modification unit in such a way that the laser light of the first and second laser light distributions meets at least one of the first and second laser light modification units 7, 8 using the determined position, and a person presence sensor 804 for determining whether a person is present in the vicinity of the lighting apparatus 801. In this embodiment, the control unit 803 is also adapted to control the lighting apparatus, in particular, the laser source 2 and/or the laser light distribution modification unit 4, in dependence on the determination whether or not a person is present in the vicinity of the lighting apparatus.

In this embodiment, the position of at least one of the laser light modification units 7, 8 can be altered, for example, by hand, wherein the new position of at least one of the laser light modification units 7, 8 can be determined by the laser light modification unit sensor 802. The laser light distribution modification unit 4 can be controlled by the control unit 803 in such a way that the laser light distribution is modified from a first to a second laser light distribution, wherein light of the second laser light distribution still meets at least one of the first and second laser light modification units 7, 8 in the altered position. The position of a laser light modification unit can thus be identified and tracked by the laser light distribution modification unit which is coupled to the laser light modification unit sensor 803, so that laser light tracks and is incident on the laser light modification unit.

The laser light modification unit sensor is, for example, an infrared (IR) sensor, a Lidar sensor, an ultrasonic sensor and/or a radio frequency identification (RFID) sensor for determining the position of a laser light modification unit.

The person presence sensor 804 is adapted to determine whether a person is present in the vicinity of the lighting apparatus, in particular, in a room, in which the lighting apparatus is located. The person presence sensor 804 can also be adapted to determine whether a person is moving in the vicinity of the lighting apparatus. This allows modification of the illumination configuration in dependence on the presence of a person or a certain action of the person. The lighting apparatus 802 can thus be used as an ambient intelligent lighting system.

Figure 3:
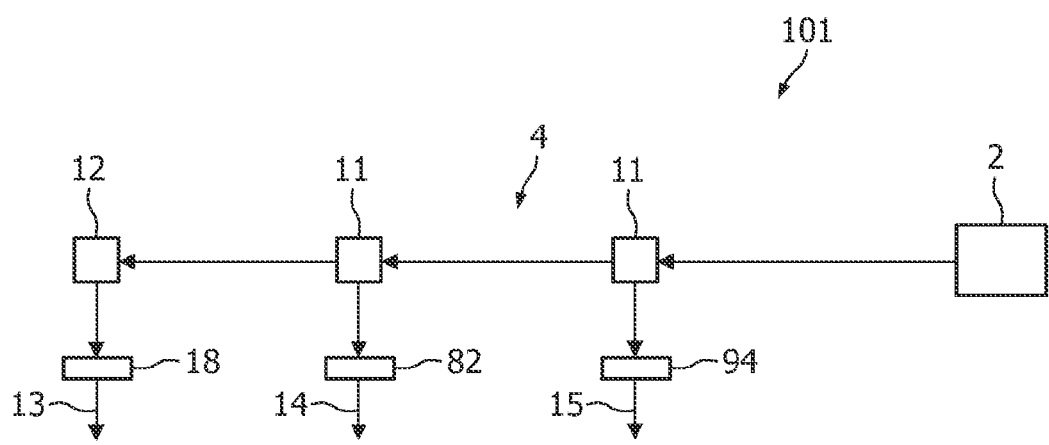
FIG. 3 shows schematically, by way of example, a further embodiment of a lighting apparatus comprising beam-splitting units and a redirection unit.

FIG. 3 shows schematically, by way of example, another embodiment of a lighting apparatus 101 according to the invention.

The lighting apparatus 101 comprises a laser source 2 for emitting laser light 4. The lighting apparatus 101 further comprises two beam-splitting units 11 for splitting the laser light 4 into at least a first and a second beam. The light from the beam-splitting units 11 is directed onto laser light modification units 82, 94. An example of a beam-splitting unit 11 is schematically shown in FIG. 4 in more detail.

Figure 4:
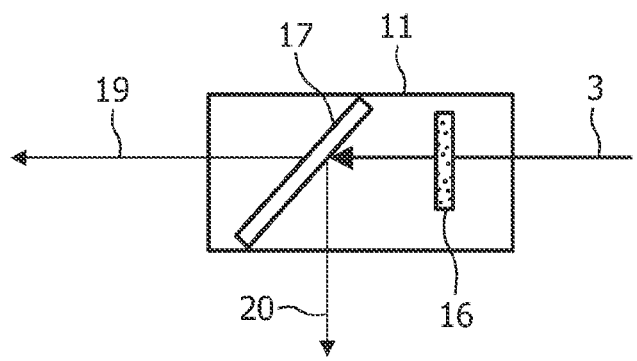
FIG. 4 shows schematically, by way of example, one of the beam-splitting units.

In FIG. 4, the laser light 3 is directed onto a beam splitter 17 which splits the laser light 3 into a first beam 20 and a second beam 19. The first beam 20 is directed onto a laser light modification unit 82, 94, which can be regarded as a first laser light modification unit or a second laser light modification unit and is assigned to the respective beam-splitting unit 11. The laser light modification unit 82 or 94 emits modified light 15 if the first light beam 20 is directed onto the laser light modification unit 82 or 94, respectively. The second beam 19 is directed onto another beam-splitting unit 11 or onto a redirection unit 12 which directs the second light beam onto a further laser light modification unit 18. Alternatively, the second light beam 19 can be directly directed onto another laser light modification unit.

In FIG. 4, the beam-splitting unit 11 further comprises an adjustable half-wave plate 16 for modifying the relative intensity of the first and second light beams with respect to each other. This is, for example, achieved by using the adjustable half-wave plate located in front of the polarizing beam splitter 17, so that the light traverses the half-wave plate before impinging upon the beam splitter. In this embodiment, the intensity of the first and the second beam relative to each other can be modified by modifying or adjusting the state or direction of polarization of the light by means of the half-wave plate. Instead of the half-wave plate, another polarization converter or polarization rotator can be used.

Instead of the polarizing beam-splitting mirror 17, another polarizing beam-splitting element can be used, such as a beam-splitting cube or a switchable mirror.

Figure 5:
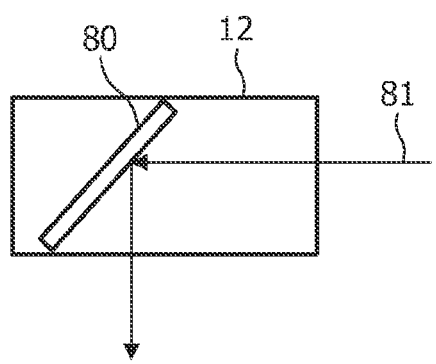
FIG. 5 shows schematically, by way of example, a redirection unit.

An embodiment of a redirection unit 12 is schematically shown by way of example in FIG. 5.

In this embodiment, the redirection unit 12 comprises a redirection element 80 which redirects the incoming laser light 81 without splitting it, which, in this embodiment, is a second light beam of a beam-splitting unit 11, onto a laser light modification unit 18 which generates modified light 13 and in particular emits luminescent light if the laser light is directed onto the laser light modification unit 18, and which is assigned to the redirection unit 12. The mirror 80 can be replaced by another redirection element such as a reflecting prism. In another embodiment, the redirection element 80 can be omitted and the incoming laser light 81 can be directed directly onto the luminescent material 82 for emitting luminescent light 13.

Figure 6:
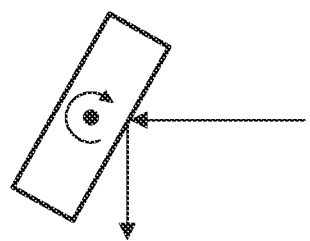
FIGS. 6 to 8 show schematically, by way of example, different redirection elements.
Figure 7:
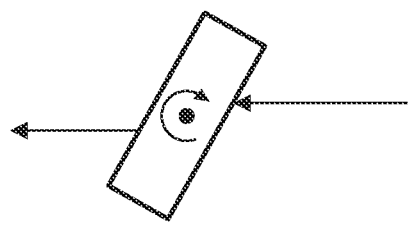
Figure 8:
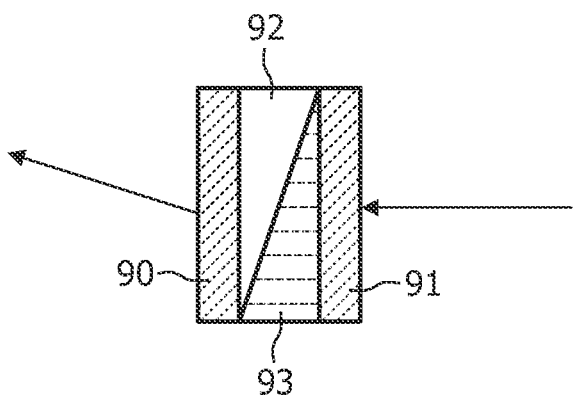

In other embodiments, the redirection element may be a rotating mirror which, for example, can be rotated so that the reflecting angle of the light is changed. An example of a rotating mirror is schematically shown in FIG. 6. In a further embodiment, the redirection element may be a rotating glass plate, an example of which is schematically shown in FIG. 7 and which can be rotated in such a way that the direction of the light and/or a parallel shift of the light is modified. The redirection element may also be a liquid crystal element, an example of which is schematically shown in FIG. 8. This redirection element is obtained by placing a wedge-shaped transparent layer 92 and a liquid crystal material 93 between transparent substrates 90, 91 provided with transparent electrodes (not shown). Upon application of an electric field, the orientation of the liquid crystal molecules can be altered, thereby changing the effective refractive index of the liquid crystal for changing the direction of the light.

The distribution of the laser light directed onto the laser light modification units can be modified by modifying the relative intensity in at least one of the beam-splitting units 11, thereby modifying the illumination configuration of the lighting apparatus 101. In this embodiment, the beam splitter 17 is a polarizing beam splitter which splits the light in dependence on the polarization of the laser light incident on the beam splitter. The intensity of one of the first and second beams can thus be modified relative to the intensity of the other of the first and second beams by modifying the state or direction of polarization of the light impinging upon the beam splitter by means of the half-wave plate 16 or another optical element, which allows modification of the polarization of the light. The different laser light modification units 18, 82, 94 preferably modify the light differently, for example, different laser light modification units may comprise different luminescent materials emitting different luminescent light. For example, the luminescent materials can emit light having different wavelengths. The beam-splitting units 11 and optionally the redirection unit 12 can be used for modifying the laser light distribution directed onto the laser light modification units. The beam-splitting units 11 and optionally the redirection unit 12 thus constitute a laser light distribution modification unit.

The half-wave plate 16 is preferably modified by electrical and/or mechanical means which can be used for controlling the half-wave plate automatically, in particular, for modifying the laser light distribution between different predefined laser light distributions in accordance with a predefined schedule, or manually.

Although the lighting apparatus, particularly the laser light modification unit comprises several beam-splitting units 11 and a redirection unit 12 in the embodiment described above and illustrated with reference to FIG. 3, the lighting apparatus may comprise only one beam-splitting unit and/or only one redirection unit in other embodiments. Furthermore, in another embodiment, the lighting apparatus may comprise a different number of beam-splitting units and/or redirection units.

The beam-splitting units 11 and/or the redirection unit 12 may comprise a casing in which the respective components of the beam-splitting units and the redirection unit are arranged and preferably mounted.

Figure 9:
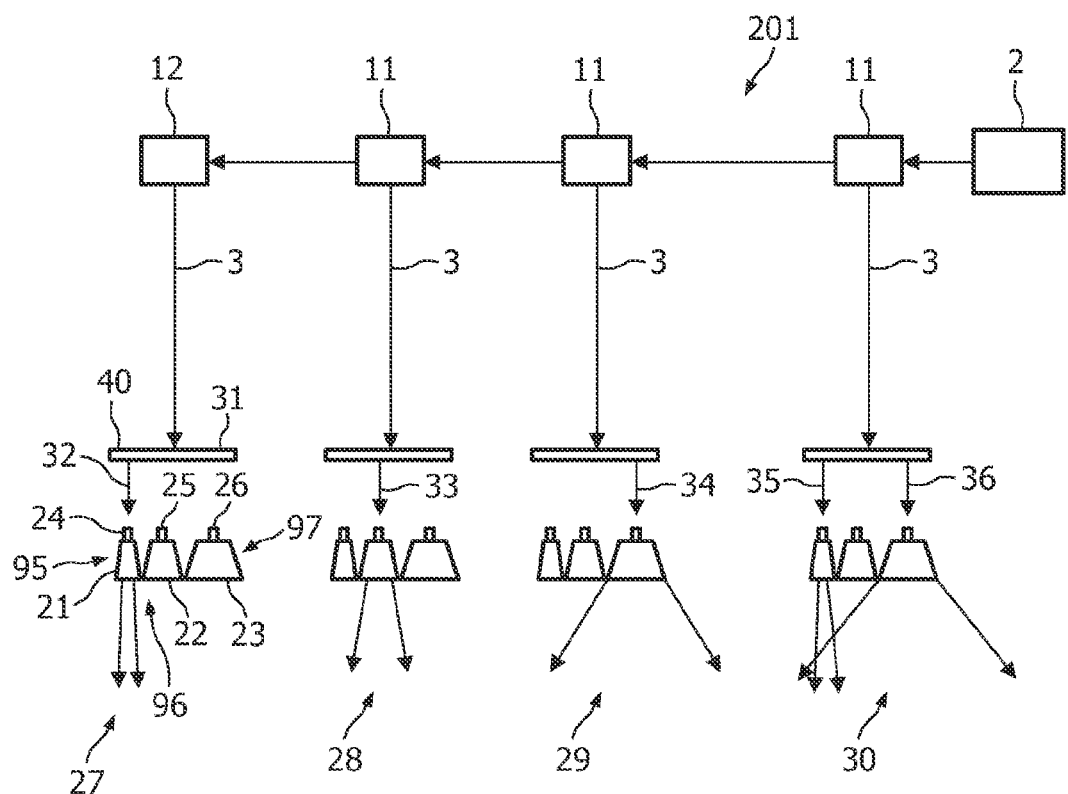
FIGS. 9 to 13 show schematically, by way of example, different further embodiments of a lighting apparatus.

FIG. 9 shows schematically, by way of example, another embodiment of a lighting apparatus 201.

The lighting apparatus 201 comprises a laser source 2 emitting laser light 3 which is directed onto several beam-splitting units 11 and a redirection unit 12. The laser light 3 is directed onto several optical switches 40, with several laser light modification units 95, 96, 97 being assigned to each optical switch 40. In this embodiment, each laser light modification unit 95, 96, 97 comprises a luminescent material 24, 25, 26 and a beam shaper 21, 22, 23, respectively. The luminescent materials 24, 25, 26 are preferably materials that absorb the laser light having a certain spectral distribution and emit luminescent light with a spectral distribution which is different from the spectral distribution of the laser light. In other embodiments, the luminescent materials 24, 25, 26 can be replaced by transparent materials which do not change the spectral distribution of the laser light. However, the transparent materials may change the direction of the laser light, for example, by scattering. In a further embodiment, the luminescent materials and also the transparent materials are not present in the laser light modification units. The optical switch 40 is adapted to redirect the laser light 3 onto one, several or all of the laser light modification units 95, 96, 97 assigned to the respective optical switch. Furthermore, the optical switch 40 is preferably adapted to modify the ratio of the intensities of the laser light directed onto at least one of the laser light modification units 95, 96, 97.

In this embodiment, the beam shapers 21, 22, 23 shape the light beam emitted by the respective luminescent material differently. In particular, the beam shaper 21 generates a beam shape having the smallest divergence, the beam shaper 22 generates a beam shape having a middle divergence and the beam shaper 23 generates a beam shape having the largest divergence. The laser light 32 is directed onto the luminescent material 24 in such a way that the luminescent light emitted by the luminescent material 24 has a beam shape with a relatively small divergence. The laser light 33 is directed onto the luminescent material 25 in such a way that the beam shaper 22 generates a beam shape having a middle divergence, and the laser light 34 is directed onto the luminescent material 26 in such a way that the beam shaper 23 generates a beam shape 29 having the largest divergence. On the right-hand side in FIG. 9, laser light 35 and laser light 36 are directed simultaneously onto the luminescent materials 24 and 26 in such a way that a beam shape of the luminescent light is generated, which is a combination of the beam shape having a small divergence and the beam shape having a large divergence. The beam shape can thus be modified by directing the laser light onto one or several of the beam shapers 21, 22, 23 directly or via luminescent or transparent materials, which may scatter the laser light.

The beam shapers are preferably micro beam-shaping elements.

The collimation of the light can be modified by using the beam shapers.

In one embodiment, the combination of an optical switch 40, optionally of the luminescent materials assigned to the respective optical switch and the beam shapers optionally attached to the luminescent materials can be regarded as a single unit within the lighting apparatus. In another embodiment, the lighting apparatus comprises only one of these units. Laser light can be directed directly onto one or several of the optical switches 40 via the beam-splitting units 11 and the redirection unit 12 as schematically shown by way of example in FIG. 9, or via other beam-splitting units and redirection units comprising beam splitters and mirrors. In a further embodiment, the lighting apparatus comprises several of these units, whose number may differ from the number shown in FIG. 9. A single unit or several units can be arranged within a single casing or several casings.

The beam-splitting units 11, the redirection unit 12 and the optical switches 40 form a laser light distribution modification unit for modifying a laser light distribution directed onto at least one of the laser light modification units 95, 96, 97 which can be regarded as several first and second laser light modification units.

Figure 10:
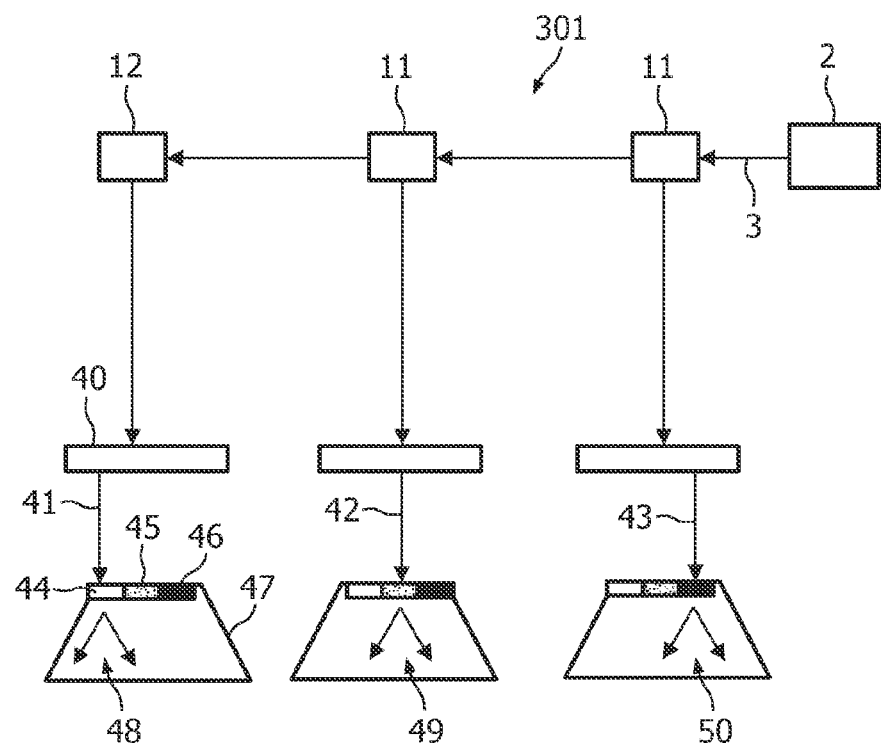

FIG. 10 shows schematically, by way of example, a further embodiment of a lighting apparatus 301.

The lighting apparatus 301 comprises a light source 2 emitting laser light 3 which is directed onto optical switches 40 via beam-splitting units 11 and a redirection unit 12. Three laser light modification units 44, 45, 46, which are three luminescent materials 44, 45, 46 in this embodiment, are assigned to each optical switch 40 which is adapted in such a way that the laser light can be directed onto one, several or all of these laser light modification units 44, 45, 46. In particular, each luminescent material 44, 45, 46 is addressable by using the optical switch 40. The different luminescent materials 44, 45, 46 emit luminescent light having different colors, i.e. different spectral distributions, particularly different wavelengths. Different colors can be generated by modifying the laser light distribution onto these luminescent materials 44, 45, 46 by the optical switch 40, wherein the laser light is directed onto one, several or all of the luminescent materials 44, 45, 46. In particular, the optical switch 40 is adapted to modify the ratio of the intensities of laser light directed onto at least two luminescent materials which are assigned to the same optical switch 40. In this embodiment, a beam shaper 47 for shaping the luminescent light emitted from the luminescent materials 44, 45, 46 is attached to a group of three luminescent materials 44, 45, 46, i.e. of three laser light modification units. The light beam 41 is directed onto the luminescent material 44, the light beam 42 is directed onto the luminescent material 45 and the light beam 43 is directed onto the luminescent material 46 in such a way that, in the laser light distribution shown in FIG. 10, three different light beams having three different colors are emitted. Preferably any color or color temperature of the light emitted by the luminescent materials can be obtained by modifying the laser light distribution, particularly by adjusting the intensities of the laser light incident on the luminescent materials.

The optical switch can be based on at least one of the following components to be arranged in a manner well known to a person skilled in the art so as to provide a desired optical switch: a liquid crystal, an electrical and/or mechanical means such as shutters, beam splitters, mirrors, etc. A beam shaper is, for example, a conical tube having an inner side which is reflecting, particularly totally reflecting for the light, and in which the cone angle corresponds to the collimation of the generated beam shape. A beam shaper may also comprise a parabolic reflector which can produce desired beam shapes with a desired collimation.

The combination of an optical switch, the luminescent materials assigned to the respective optical switch and optionally a beam shaper assigned to the luminescent materials can be regarded as a single color unit. In one embodiment, the lighting apparatus comprises only one of these color units. In a further embodiment, the lighting apparatus may comprise several color units whose number may differ from the three color units shown in FIG. 10. The components of a color unit can be arranged within a color unit casing.

The beam-splitting units 11, the redirection unit 12 and the optical switches 40 can be regarded as a laser light distribution modification unit which is adapted to modify the laser light distribution directed onto at least one of the laser light modification units 44, 45, 46 which can be regarded as first and second laser light modification units. Instead of the beam-splitting units 11 and the redirection unit 12, other beam-splitting elements and redirection elements can be used, for example, simple mirrors and beam splitters. In one embodiment, the laser light distribution modification unit may comprise only a single optical switch 40 which is directly illuminated by laser light from the laser source 2.

Figure 11:
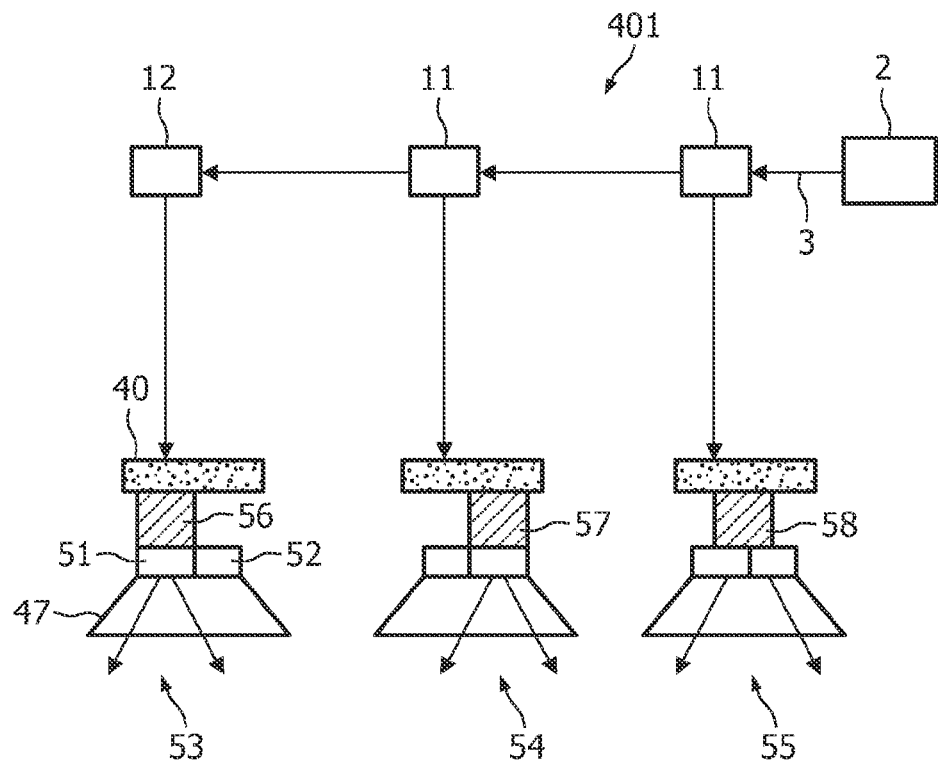

A further embodiment of a lighting apparatus is schematically shown by way of example in FIG. 11.

The lighting apparatus 401 comprises a light source 2 emitting laser light 3 which is directed onto optical switches 40 via beam-splitting units 11 and a redirection unit 12. The lighting apparatus 401 further comprises several laser light modification units 51, 52 comprising, in this embodiment, luminescent materials 51, 52 assigned, in this embodiment, to each optical switch 40, wherein the luminescent material 51 emits luminescent light having a different color temperature $T_1$ than a color temperature $T_2$ of the luminescent light emitted by the luminescent material 52. The light beam 56, which is directed onto the luminescent material 51, emits luminescent light 53 having the color temperature $T_1$. The light beam 57, which is directed onto the luminescent material 52, emits luminescent light 54 having the color temperature $T_2$. On the right-hand side in FIG. 11, light beam 58 is directed onto the luminescent materials 51, 52 simultaneously, thereby generating luminescent light 55. The optical switch 40 is adapted to modify the ratio of the intensities of the light directed onto the luminescent materials assigned to the same optical switch 40 so that any color temperature between $T_1$ and $T_2$ can be obtained. In this embodiment, a beam shaper 47 for shaping the luminescent light generated by the luminescent materials is attached to each combination of the two luminescent materials 51, 52. This beam shaper 47 can be omitted.

In FIG. 11, the light beams 56, 57, 58 are shown at certain locations. In a preferred embodiment, the optical switch 40 is adapted to continuously shift the light beams from one location to another location, wherein, in this case, the ratio of the areas on the first luminescent material 51 and the second luminescent material 52 illuminated by the light beam from the optical switch 40 determines the color temperature of the light emitted by the laser light modification units, i.e. the luminescent materials 51, 52.

The optical switch, the laser light modification units comprising the luminescent materials assigned to the optical switch and optionally also the beam shaper assigned to the luminescent materials define a color unit. The lighting apparatus may comprise only one or several of these color units whose number may differ from the number of three shown in FIG. 10. The components of the color unit can be arranged within a color unit casing.

The beam-splitting units 11, the redirection unit 12 and the optical switches 40 constitute a laser light distribution modification unit for modifying a laser light distribution directed onto at least one of the laser light modification units which, in this embodiment, comprise the luminescent materials 51, 52 and can be regarded as first and second laser light modification units. In other embodiments, the laser light can be directed directly onto the optical switch 40 in such a way that this switch can be regarded as a laser light distribution modification unit. In another embodiment, the lighting apparatus may comprise a different number of beam-splitting units, optional redirection units, optical switches and laser light modification units, i.e. luminescent materials 51, 52.

Figure 12:
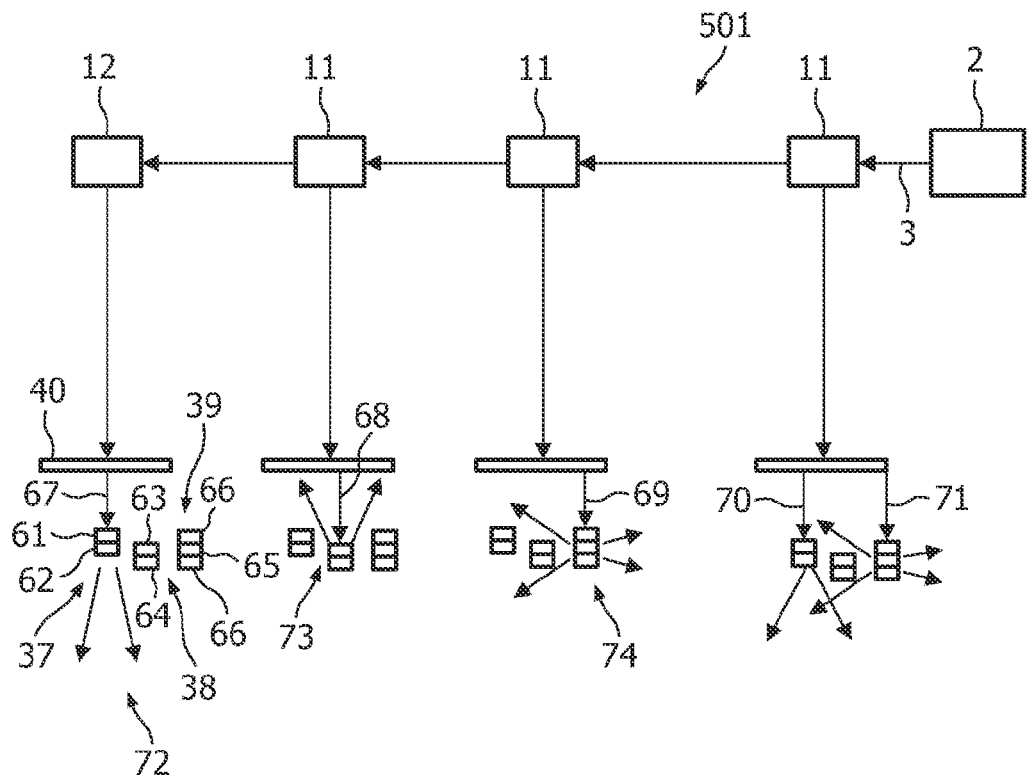

FIG. 12 shows schematically, by way of example, another embodiment of a lighting apparatus.

The lighting apparatus 501 comprises a light source 2 emitting laser light 3 which is directed onto optical switches 40 via beam-splitting units 11 and a redirection unit 12. The lighting apparatus 501 further comprises laser light modification units 37, 38, 39 each comprising a luminescent material 62, 63 or 65 and a redirection element 61, 64 or 66, respectively. The laser light modification units 37, 38, 39 are assigned to the optical switches 40 adapted to direct the laser light onto one, several or all of the laser light modification units 37, 38, 39, particularly of the luminescent materials 62, 63, 65. A redirection element 61, 64, 66 is assigned to several of the luminescent materials 62, 63, 65, in particular, to each luminescent material 62, 63, 65, while different redirection elements are assigned to different luminescent materials 62, 63, 65 assigned to the same optical switch so that luminescent light emitted from different luminescent materials of different laser light modification units 37, 38, 39 assigned to the same optical switch is directed into different directions. For example, luminescent light emitted by the luminescent material 62 is directed into the direction 72 by the redirection element 61, luminescent light emitted by the luminescent material 63 is directed into the direction 73 by the redirection element 64, and luminescent light emitted by the luminescent material 65 is directed into the direction 74 by the redirection element 66. The light beam 67 is directed onto the luminescent material 62 which is directed into the direction 72 by the redirection element 61. The light beam 68 is directed onto the luminescent material 63 which emits luminescent light directed into the direction 73 by the redirection element 64, and the light beam 69 is directed onto the luminescent material 65 which emits luminescent light directed into the direction 74 by the redirection element 66. On the right-hand side in FIG. 11, the optical switch 40 directs light beams 70 and 71 simultaneously onto luminescent materials so that luminescent light is emitted, which is directed into a combined direction by the redirection elements 61 and 66 assigned to the luminescent materials 62, 65 onto which the light beams 70, 71 are directed. The direction of the luminescent light emitted by the luminescent materials can be modified by modifying the laser light distribution directed onto the laser light modification units by means of the laser light distribution modification unit which, in this embodiment, is constituted by the optical switch 40, the beam-splitting units 11 and the redirection unit 12. The optical switch 40 can direct the laser light onto one, several or all luminescent materials of the laser light modification units assigned to the respective optical switch. Furthermore, the optical switch is adapted to modify the ratio of the intensities of the light beams directed onto at least two luminescent materials of the laser light modification units assigned to the same optical switch, in order to modify the direction of the luminescent light emitted by at least two of the luminescent materials 61, 63, 65.

Instead of or in addition to the luminescent materials, the laser light modification units may comprise another material or no material at all, the other material being preferably a non-absorbing material. It is further preferred that this other material is a light-scattering material which changes the direction of the laser light by scattering it.

The combination of an optical switch, the luminescent materials assigned to the optical switch and the redirection elements assigned to the luminescent materials can be regarded as a single redirection unit. The lighting apparatus may comprise only one or several of these redirection units whose number may differ from that shown in FIG. 12. The components of the single redirection unit or of several redirection units can be arranged within a redirection unit casing.

The beam-splitting units 11, the redirection unit 12 and the optical switches 40 constitute a laser light distribution modification unit for modifying the laser light distribution directed onto at least one of the laser light modification units 37, 38, 39 which can be regarded as first and second laser light modification units. If, in other embodiments, the laser light 3 is directed directly onto the optical switch 40, this switch can be regarded as a laser light distribution modification unit. Instead of the beam-splitting units 11 and/or the redirection unit 12, other elements for beam-splitting and redirecting a beam can be used, for example, mirrors and/or beam splitters. The example of the lighting apparatus 501 schematically shown in FIG. 12 may comprise a different number of beam-splitting units 11, redirection units 12, optical switches 40, laser light modification units 37, 38, 39, luminescent materials and redirection elements within a laser light modification unit.

Figure 13:
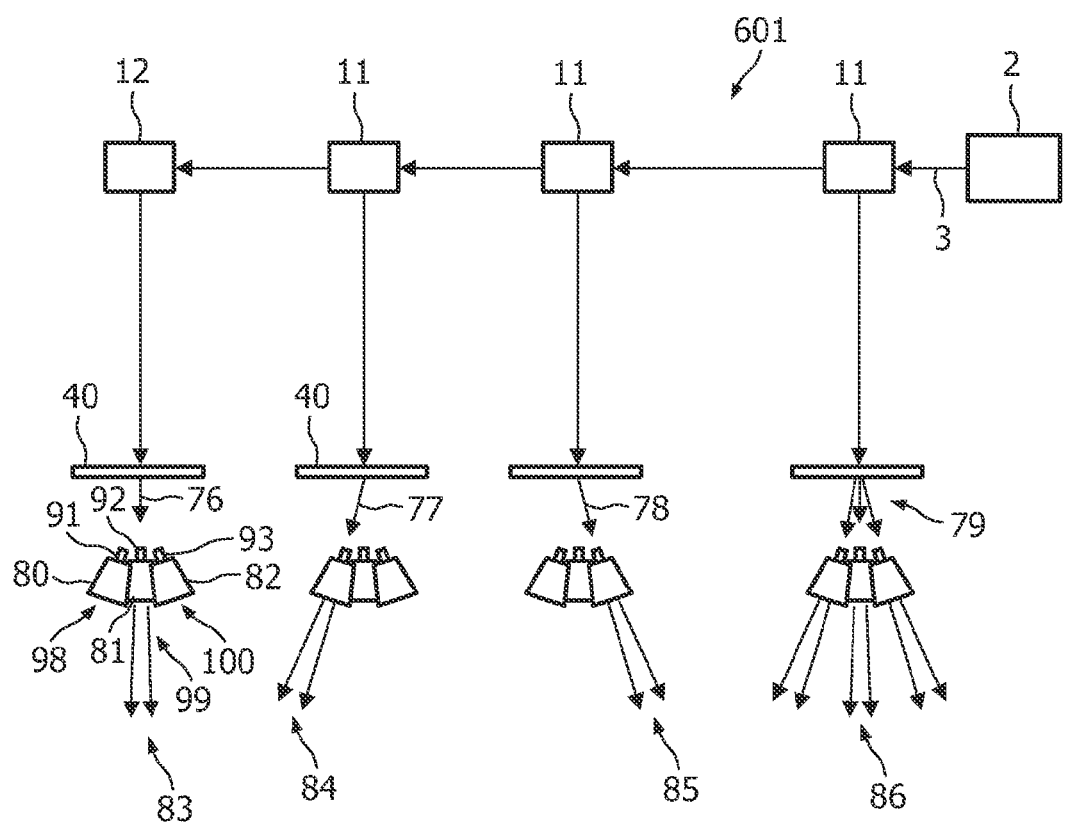

A further embodiment of a lighting apparatus 601 is schematically shown by way of example in FIG. 13.

The lighting apparatus 601 comprises a laser source 2 emitting laser light 3 which is directed onto optical switches 40 via beam-splitting units 11 and a redirection unit 12. The optical switches 40 are adapted to direct the laser light onto at least one of several laser light modification units 98, 99, 100 each comprising one of several luminescent materials 91, 92, 93 and one of several beam shapers 80, 81, 82 directed into different directions and preferably attached to the luminescent materials 91, 92, 93. In particular, a beam shaper 80, 81, 82 is assigned and preferably attached to each luminescent material 91, 92, 93. If the light beam 76 is directed onto the luminescent material 92, the beam shaper 81 shapes the beam and directs the same into the direction 83. If the optical switch 40 directs the light 77 onto the luminescent material 91, the luminescent light is shaped and directed by the beam shaper 80 into the direction 84, and if the light beam 78 is directed onto the luminescent material 93, luminescent light is generated, which is shaped by the beam shaper 82 and directed into the direction 85. On the right-hand side in FIG. 12, the optical switch 40 directs the laser light onto three luminescent materials 91, 92, 93 simultaneously, generating luminescent light which is directed into the direction 86. The optical switch 40 can direct the laser light onto one, several or all luminescent materials of the laser light modification units assigned to the respective optical switch. Furthermore, the optical switch 40 is adapted to modify the ratio of the intensities of the laser light directed onto at least two different luminescent materials. The optical switch 40, which can be regarded as a component of the laser light distribution modification unit, can thus modify the laser light distribution, and the shape and/or direction of the luminescent light emitted by the luminescent materials can be modified by modifying this laser light distribution.

The laser light modification units 98, 99, 100 may comprise another material or no material instead of the luminescent materials 91, 92, 93. For example, materials which do not change the spectral distribution of the laser light but rather change, for example, its direction, for example, by scattering can be used instead of the luminescent materials.

The combination of an optical switch and the laser light modification units, which preferably comprise the luminescent materials and the beam shapers assigned to the optical switch, constitutes a single beam-shaping and redirection unit, in which the lighting apparatus may comprise one or several of these beam-shaping and redirection units, and in which the number of beam-shaping and redirection units may differ from that shown in FIG. 13. The components of a single beam-shaping and redirection unit or of several beam-shaping and redirection units can be arranged within a beam-shaping and redirection unit casing.

In this embodiment, the beam-splitting units 11, the redirection unit 12 and the optical switches 44 constitute a laser light distribution modification unit for modifying the laser light distribution directed onto at least one of the laser light modification units 98, 99, 100 which can be regarded as first and second laser light modification units. If, in other embodiments, the laser light is directed directly onto the optical switches, this switch is regarded as the laser light distribution modification unit. In one embodiment, the laser light distribution modification unit comprises only the optical switch 40 for modifying the laser light distribution directed onto at least one of several laser light modification units. In further embodiments, the number of beam-splitting units 11, redirection unit 12, optical switches 40, laser light modification units 98, 99, 100 and the number of luminescent materials 91, 92, 93 and beam-shaping and redirection elements 80, 81, 82 may differ from the numbers shown in FIG. 13. These numbers, which may be different from those shown in FIG. 13, may also be zero.

Figure 14:
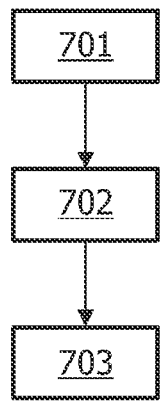
FIG. 14 shows, by way of example, a flow chart illustrating an embodiment of a lighting method.

An embodiment of a lighting method will now be described by way of example with reference to a flowchart shown in FIG. 14.

In step 701, laser light 3 is emitted by a laser source 2.

In step 702, the laser light is directed onto at least one of a first and a second laser light modification unit, the first laser light modification unit 7 being situated at a first location and adapted to modify the optical characteristic of the laser light. It preferably comprises a first luminescent material for emitting first luminescent light 9 if the laser light 3, 5 is directed onto the first laser light modification unit. The spectral distribution of the first luminescent light 9 is different from that of the laser light 3, 5. The second laser light modification unit 8 is situated at a second location and is adapted to modify an optical characteristic of the laser light. It preferably comprises a second luminescent material for emitting second luminescent light 10 if the laser light 3, 6 is directed onto the second laser light modification unit 8. The spectral distribution of the second luminescent light 10 is different from that of the laser light 3, 6.

Steps 701 and 702 are preferably performed simultaneously.

In step 703, a laser light distribution defined by the laser light directed onto at least one of the first and second laser light modification units 7, 8 is modified by the laser light distribution modification unit 4 from a first to a second laser light distribution which is different from the first laser light distribution.

The luminescent materials are preferably phosphor materials, in particular, organic and/or inorganic phosphor materials. The luminescent materials are preferably materials which can be excited by blue and/or violet light, in particular by light having a wavelength within a range of 405 to 470 nm. The luminescent materials preferably convert the laser light into white light or light having a different color. The luminescent materials are preferably supported on a supporting element, which is preferably a supporting plate and is transmissive to the luminescent light emitted by the luminescent materials. The supporting plate is preferably a glass plate. The supporting element is preferably also a part of the lighting apparatus. The luminescent material is preferably provided as a luminescent layer on the supporting element.

If the components of the lighting apparatus, i.e. at least the laser source, the laser light modification units and the laser light distribution modification unit, are located substantially within the same plane, the above-described modification of the direction of the luminescent light by modifying the laser light distribution is preferably performed in such a way that the direction of the luminescent light can be modified between a total edge emission, a top emission and a bottom emission, the top and bottom emissions defining a light emission outside plane in which the components of the lighting apparatus are substantially located, and the total edge emission defining a direction of the luminescent light within this plane.

Certain optical elements such as mirrors, beam splitters, half-wave plates etc. are used in the embodiments described above. In other embodiments, other optical elements such as a diaphragm can be used alternatively or in addition, while the aperture diameter of the diaphragm can be modified so as to modify the diameter of the laser light directed onto at least one of the first and second laser light modification units. The half-wave plates may be passive or active half-wave plates, and polarizing reflectors may be used, for example, to modify the intensity of the light directed onto the luminescent materials. The optical elements can be arranged in a micro-electromechanical system (MEMS) on a substrate or on a chip.

The laser light distribution modification unit can be adapted in such a way that it only comprises non-moving elements which are preferably based on liquid crystals as schematically shown by way of example in FIG. 8. The use of non-moving elements only allows modification of the laser light distribution from a first to a second laser light distribution without moving an element of the laser light distribution modification unit. The liquid crystals are based on, for example, wedge-shaped liquid crystal elements or elements in which a refractive index gradient is formed within the liquid crystal.

The light source may be any source that emits laser light, particularly usable for exciting luminescent materials in such a way that they emit luminescent light. The light source is preferably a laser which emits blue and/or violet light.

All components of the lighting apparatus are preferably arranged within a casing.

The luminescent material is preferably arranged in points or dots.

Although the lighting apparatus comprises a certain number of optical elements, different units such as beam-splitting units or redirection units, or luminescent materials in the embodiment described above, the number of optical elements, units, luminescent materials and other components of the lighting apparatus may be different in other embodiments.

Other variants of the disclosed embodiments can be understood and effected by those skilled in the art in practicing the claimed invention, from a study of the drawings, the disclosure, and the appended claims.

In the claims, use of the verb "comprise" and its conjugations does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A lighting apparatus comprising:
a laser source for emitting laser light,
a first laser light modification unit for modifying an optical characteristic of the laser light, said first laser light modification unit being situated at a first location,
a second laser light modification unit for modifying an optical characteristic of the laser light, said second laser light modification unit being situated at a second location, wherein the first and second laser light modification units are adapted to modify the optical characteristic of the laser light differently, such that a spectral distribution of the laser light modified by the first laser light modification unit is different from a spectral distribution of the laser light modified by the second laser light modification unit;
a laser light distribution modification unit for modifying a laser light distribution directed onto at least one of the first and second laser light modification units from a first to a second laser light distribution which is different from the first laser light distribution, wherein the laser light distribution modification unit comprises at least one beam-splitting unit for splitting the laser light into a first beam directed onto the first laser light modification unit and a second beam directed onto the second laser light modification unit, the at least one beam-splitting unit being adapted in such a way that an intensity of at least one of the first beam and the second beam is modifiable;
a person presence sensor for determining whether a person is present in the vicinity of the lighting apparatus, and
a control unit for controlling the lighting apparatus in dependence on the determination whether a person is present in the vicinity of the lighting apparatus.

2. The lighting apparatus as defined in claim 1, wherein at least one of the first and second laser light modification units comprises a luminescent material for emitting luminescent light if the laser light is directed onto the luminescent material.

3. The lighting apparatus as defined in claim 2, wherein the first laser light modification unit comprises a first luminescent material for emitting first luminescent light if the laser light is directed onto the first luminescent material, the second laser light modification unit comprises a second luminescent material for emitting second luminescent light if the laser light is directed onto the second luminescent material, and the spectral distribution of the first and the second luminescent light is different.

4. The lighting apparatus as defined in claim 1, wherein the first laser light distribution comprises an intensity distribution of the laser light directed onto at least one of the first and second laser light modification units, which is different from the intensity distribution of the laser light directed onto at least one of the first and second laser light modification units of the second laser light distribution.

5. The lighting apparatus as defined in claim 1, wherein the laser light distribution modification unit comprises several beam-splitting units for splitting the laser light into a first beam and a second beam, wherein at least one of the first and second laser light modification units is assigned to at least one of the beam-splitting units, said beam-splitting units being adapted to direct the first beam of at least one of the beam-splitting units to the at least one of the first and second laser light modification units assigned to the at least one beam-splitting unit and to direct the second beam of the at least one beam-splitting unit to another beam-splitting unit, said at least one beam-splitting unit being adapted in such a way that an intensity of at least one of the first beam and the second beam is modifiable.

6. The lighting apparatus as defined in claim 1, wherein at least one of the first and second laser light modification units comprises a beam-shaping unit for beam-shaping light directed onto the beam-shaping unit.

7. The lighting apparatus as defined in claim 6, wherein the first laser light modification unit comprises a first beam-shaping unit for beam-shaping light directed onto the first beam-shaping unit, and the second laser light modification unit comprises a second beam-shaping unit for beam-shaping light directed onto the second beam-shaping unit, said first beam-shaping unit and second beam-shaping unit being adapted to beam-shape light differently.

8. The lighting apparatus as defined in claim 1, wherein at least one of the first and second laser light modification units comprises a redirection unit for redirecting light directed onto the at least one of said first and second laser light modification units.

9. The lighting apparatus as defined in claim 8, wherein the first laser light modification unit comprises a first redirection unit for redirecting light directed onto the first laser light modification unit, and the second laser light modification unit comprises a second redirection unit for redirecting light directed onto the second laser light modification unit, said first redirection unit and second redirection unit being adapted to redirect light in different directions.

10. The lighting apparatus as defined in claim 1, further comprising:
a laser light modification unit sensor for determining the position of at least one of the first and second laser light modification units, and
a control unit for controlling the laser light distribution modification unit in such a way that laser light of the first and second laser light distributions meets at least one of the first and second laser light modification units, using the determined position.

11. The lighting apparatus as defined in claim 1, wherein the first and second laser light modification units are arranged adjacent to one another.

12. The lighting apparatus as defined in claim 11, wherein the distance between the first and second laser light modification units is smaller than 1 cm.

13. The lighting apparatus as defined in claim 12, wherein the distance between the first and second laser light modification units is smaller than 1 mm.

14. A lighting method comprising the steps of:
emitting laser light from a laser source,
directing the laser light onto at least one of a first laser light modification unit and a second laser light modification unit, said first laser light modification unit being situated at a first location and adapted to modify an optical characteristic of the laser light, said second laser light modification unit being situated at a second location and adapted to modify an optical characteristic of the laser light, wherein the first and second laser light modification units are adapted to modify the optical characteristic of the laser light differently, such that a spectral distribution of the laser light modified by the first laser light modification unit is different from a spectral distribution of the laser light modified by the second laser light modification unit;
modifying, by means of a laser light distribution modification unit, a laser light distribution directed onto at least one of the first and second laser light modification units from a first to a second laser light distribution which is different from the first laser light distribution, wherein the laser light distribution modification unit comprises several beam-splitting units for splitting the laser light into a first beam and a second beam, wherein at least one of the first and second laser light modification units is assigned to at least one of the beam-splitting units, said beam-splitting units being adapted to direct the first beam of at least one of the beam-splitting units to the at least one of the first and second laser light modification units assigned to the at least one beam-splitting unit and to direct the second beam of the at least one beam-splitting unit to another beam-splitting unit, said at least one beam-splitting unit being adapted in such a way that an intensity of at least one of the first beam and the second beam is modifiable;
determining whether a person is present in the vicinity of the lighting apparatus, and
controlling the lighting apparatus in dependence on the determination whether a person is present in the vicinity of the lighting apparatus.

15. A lighting apparatus comprising:
a laser source for emitting laser light,
a first laser light modification unit for modifying an optical characteristic of the laser light, said first laser light modification unit being situated at a first location,
a second laser light modification unit for modifying an optical characteristic of the laser light, said second laser light modification unit being situated at a second location, wherein the first and second laser light modification units are adapted to modify the optical characteristic of the laser light differently, such that a spectral distribution of the laser light modified by the first laser light modification unit is different from a spectral distribution of the laser light modified by the second laser light modification unit;
a laser light distribution modification unit for modifying a laser light distribution directed onto at least one of the first and second laser light modification units from a first to a second laser light distribution which is different from the first laser light distribution.

16. A lighting apparatus comprising:
a laser source for emitting laser light,
a first laser light modification unit for modifying an optical characteristic of the laser light, said first laser light modification unit being situated at a first location,
a second laser light modification unit for modifying an optical characteristic of the laser light, said second laser light modification unit being situated at a second location,
a laser light distribution modification unit for modifying a laser light distribution directed onto at least one of the first and second laser light modification units from a first to a second laser light distribution which is different from the first laser light distribution, wherein the laser light distribution modification unit comprises at least one beam-splitting unit for splitting the laser light into a first beam directed onto the first laser light modification unit and a second beam directed onto the second laser light modification unit, the at least one beam-splitting unit being adapted in such a way that an intensity of at least one of the first beam and the second beam is modifiable, wherein the first and second laser light modification units are adapted to modify the optical characteristic of the laser light differently, such that one of the first or second laser light modification units comprises a luminescent material for emitting luminescent light if the laser light is directed onto the luminescent material.

17. A lighting apparatus comprising:
a laser source for emitting laser light,
a first laser light modification unit for modifying an optical characteristic of the laser light, said first laser light modification unit being situated at a first location,
a second laser light modification unit for modifying an optical characteristic of the laser light, said second laser light modification unit being situated at a second location, wherein the first and second laser light modification units are adapted to modify the optical characteristic of the laser light differently, such that a spectral distribution of the laser light modified by the first laser light modification unit is different from a spectral distribution of the laser light modified by the second laser light modification unit;
a laser light distribution modification unit for modifying a laser light distribution directed onto at least one of the first and second laser light modification units from a first to a second laser light distribution which is different from the first laser light distribution, wherein the laser light distribution modification unit comprises at least one beam-splitting unit for splitting the laser light into a first beam directed onto the first laser light modification unit and a second beam directed onto the second laser light modification unit, the at least one beam-splitting unit being adapted in such a way that an intensity of at least one of the first beam and the second beam is modifiable, wherein the first laser light distribution corresponds to the laser light directed only onto the first laser light modification unit, and wherein the second laser light distribution corresponds to the laser light directed only onto the second laser light modification unit.

* * * * *